United States Patent Office 3,475,217
Patented Oct. 28, 1969

3,475,217
METHOD OF REJUVENATING A SUBSTRATE SURFACE HAVING DEPOSITS THEREON
Larry H. Watters, Akron, Ohio, assignor to The Goodyear Tire & Rubber Company, Akron, Ohio, a corporation of Ohio
No Drawing. Filed Oct. 9, 1967, Ser. No. 673,964
Int. Cl. C23g 1/02; B08b 3/00
U.S. Cl. 134—3                                    12 Claims

ABSTRACT OF THE DISCLOSURE

A method of rejuvenating a substrate surface having deposits thereon where the said deposits have been formed on the substrate surface when said surface was exposed to a substituted methylamine compound in the presence of water and carbon dioxide which comprises treating the deposits with an organic acid selected from at least one of the group consisting of formic acid, acetic acid and propionic acid and drying the said substrate surface. The method is particularly useful in restoring the ability of mold surfaces to release molded articles.

---

This invention relates to a method of treating a substrate which has been modified by the exposure of the substrate in the presence of water and carbon dioxide to a substituted methyl amine compound by treating the said modified substrate with an organic acid.

Various materials can be molded on substrates to form molded articles. However, it is known that various materials when molded on a substrate can modify the surface of the substrate to inhibit the ability of the surface to release the molded articles. For example, it was observed that when polyurethane reaction mixtures prepared from reactive hydrogen-containing polymeric materials, organic polyisocyanates, and polyamine compounds are cast on a substrate, the surface of the substrate can become modified so that the ability of the substrate or mold surface to release the molded article is inhibited and also the surface definition of the mold is reduced. (The term "surface definition" used in this specification refers to the distinctness and sharpness of an outline of a surface.) Thus, in a molding operation as successive molded articles are formed from the same mold, the mold surface is progressively modified and subsequent successive molded articles are more difficult to release from the mold surface, and the mold surface imparts progressively inferior decorative definitions to the surface of the resulting molded articles. As the mold surface becomes progressively modified, eventually a molded article becomes sufficiently adhered to the mold surface that it cannot be removed from the mold without destroying a portion of the mold or molded article.

I have now discovered that such substrate surfaces have been modified when the substrate surface was exposed in the presence of water and carbon dioxide to compounds referred to in this specification as substituted methyl amine compounds where the said substituted methyl amine compounds are characterized by the test which comprises forming one liter of a solution containing from about 10 to about 20 parts by weight of the substituted methyl amine compound per 100 parts by weight of methyl ethyl ketone, aging the solution for 8 hours at 25° C., warming the solution to 40° C. and passing gaseous carbon dioxide at about 25° C. through the solution at a rate of about one gaseous liter per minute to form a turbidity in the solution within 60 minutes.

Representative substituted methyl amine compounds have the structure of the Formula 1:

(1)
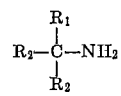

where $R_1$, $R_2$ and $R_3$ are individually selected from the group consisting of (a) hydrogen radicals, alkyl, cycloalkyl, aryl, alkaryl, and aralkyl radicals. Representative of such radicals are alkyl radicals having from one to forty carbon atoms such as methyl, ethyl, propyl, isopropyl, butyl, isobutyl, amyl, isoamyl, hexyl, isohexyl, heptyl, octyl, duodecyl and tetracontyl radicals; cycloalkyl radicals such as cyclobutane, cyclopentane, cylohexane, cycloheptane and cyclooctane; aryl radicals such as phenyl and naphthyl radicals; alkaryl radicals such as tolyl and xylyl radicals, and aralkyl radicals such as benzyl radicals; and (b) substituted alkyl, cycloalkyl, aryl, alkaryl, and aralkyl radicals where the substituents are selected from at least one of the group consisting of hydrogen, carbon, oxygen, sulphur, fluorine, chlorine, bromine, iodine, and phosphorus. Representative examples of such substituted radicals are amino radicals, imino radicals, and radicals containing amino groups, imino groups, halo groups, ether groups, and thioether groups.

The preferred substituted methyl amines are all primary diamines having their amino groups attached to nonbenzenoid carbon atoms which produce turbidity in the hereinbefore described test.

Further representative examples of the said substituted methyl amine compounds are compounds prepared by the method which comprises reacting the substituted methyl amine compound of Formula 1 with an aldehyde or ketone. Various aldehydes can be used, representative of which are formaldehyde, acetaldehyde, propionaldehyde and benzaldehyde. Various ketones can be used representative of which are acetone, methyl ethyl ketone, methyl isobutyl ketone, diisobutyl ketone, methyl n-amyl ketone, methyl-i-amyl ketone and acetophenone. These compounds are generally called aldimines and ketimines.

Representative examples of the various substituted methylamine compounds are ethylene diamine, hexamethylene diamine and dimethyl hexamethylene diamine; isophorone diamine, 1,4-cyclohexane bis methylamine, 4,4'-diamino-dicyclohexyl methane, meta xylene diamine, para-xylene diamine, tetrachloroparaxylene diamine, cyclobutane-1,2 bis methylamine, menthane diamine, imino bis propylamine, bis(amino propyl) piperazine, diethylene triamine, triethylene tetramine, and triethylene pentamine.

Because the substrate surface, when it is so modified, can have a substantially reduced ability to release molded articles, it is therefore an object of this invention to provide a method of rejuvenating such as modified substrate surface where the said substrate surface has been modified by contacting the substrate in the presence of carbon dioxide and water with the substituted methyl amine compounds. It is another object of this invention to provide a method of rejuvenating such a modified substrate surface without appreciably degrading the substrate surface where the substrate surface is a polymeric material.

Although the theory of the substrate surface modification is not thoroughly understood, my discovery discloses the modification to be in the nature of a deposit adhered to the surface of a substrate. The deposit, for example, can be adhered to the surface of an impermeable substrate surface and the deposit can be adhered to the surface and within the pores of a surface of a permeable substrate surface. The so-called deposit appears to become physically bonded to the substrate. The problem of the substrate surface modification is particularly evident when pores of a mold surface become so modified. Accordingly, when the deposits form within the pores of a mold they can bond to and be reactive with various molding materials, such as a polyurethane reaction mixture when cured, and thus cause the molded articles to adhere to the mold surface. If such a mold surface is a flexible polymeric material, the deposits can continue to form and build up in its pores and cause the surface of the mold to deform, thereby producing an inferior decorative surface definition to the molded article.

In accordance with this invention it has been found unexpectedly that a method of rejuvenating a solid substrate surface having deposits thereon, where the said deposits have been formed on the substrate surface by contacting the substrate surface in the presence of water and carbon dioxide to at least one of the substituted methyl amine compounds, comprises treating the deposits with an organic acid selected from at least one of the group consisting of formic acid, acetic acid, and propionic acid, and drying the substrate surface.

Treating the modified substrate surface by this method is found to rejuvenate or substantially restore the ability of the said surface to release the molded articles. Even if the so-called deposits are within the pores of a permeable substrate surface, this method is found to substantially restore the surface's ability to release the molded articles. However, if the deposits are within the pores of the surface, apparently normally the practice of this method does not always substantially remove the so-called deposits. This appears to be due to a physical bond which is not thoroughly understood. In this instance, if the substrate is flexible, even if the surface is treated with the organic acid and the ability of the surface to release the molded article is thereby substantially restored, the deposits can still progressively build up within the said pores, cause the substrate surface to deform and thereby cause a molded article having an inferior decorative surface definition to be produced.

Therefore, it is a further object of this invention to provide a method of removing a deposit from the pores of the surface of a permeable substrate surface where the said deposit is formed by contacting the substrate surface in the presence of water and carbon dioxide with the substituted methyl amine compounds. It is another object to provide such a method where the substrate surface is a polymeric material.

Thus, in further accordance with this invention it has also been found unexpectedly that a method of removing a deposit in the pores of a permeable substrate surface where the deposit has been formed by exposing the substrate surface in the presence of water and carbon dioxide to at least one of the substituted methyl amine compounds comprises successively treating the deposit with successively lower organic acids selected from the group consisting of formic acid, acetic acid, propionic acid, and drying the said substrate surface.

Apparently treatment of the deposit with the organic acid modifies it and changes its chemical or physical character or its bond within the pores of the substrate. Subsequent treatment of the modified deposit with a lower organic acid has surprisingly been found to substantially remove it from the pores of the substrate. Thus, the deposit is removed by first treating the modified substrate with, for example, propionic acid followed by treatment with acetic acid or formic acid. Alternatively, the modified substrate can similarly be treated with acetic acid followed by formic acid.

In the practice of this invention, although the organic acids can be used to treat the modified substrate without a solvent, it is sometimes desirable to treat the substrate with a mixture of at least one of the organic acids and at least one organic solvent. Suitable organic solvents for this purpose are preferably substantially inert solvents which will penetrate the harmful deposits, representative of which are liquid aliphatic hydrocarbons, liquid chlorinated aliphatic hydrocarbons, liquid aromatic hydrocarbons, liquid chlorinated aromatic hydrocarbons, liquid ketones and their mixtures. By the term "inert" it is meant that the solvents do not chemically react with the substrate and do not dissolve the substrate although it is understood that some solvents may dissolve some of the release agents and parting films, if release agents or parting films are used.

Representative examples of solvents are aliphatic hydrocarbons such as hexane and heptane; halogenated aliphatic hydrocarbons such as tetrachloroethylene, carbon tetrachloride and trichloroethylene; aromatic hydrocarbons such as benzene and toluene; halogenated aromatic hydrocarbons such as chlorobenzene; liquid ketones such as acetone, methyl ethyl ketone and methyl isobutyl ketone; alcohols such as methyl, ethyl, and propyl alcohol; and other organic solvents such as di-methylformamide and dimethylsulfoxide.

When the organic acids are used in the absence of solvents or used as a mixture with solvents, it is preferred that the organic acids and the mixtures of organic acids and solvents contain less than about 50 percent by weight of water based on the acid and more preferably that they are essentially water-free although traces of water can be present such as up to about 10 percent by weight of water based on the acid.

Various substrate surfaces having the deposits formed therein can be treated by the method of this invention. The invention has particular utility where the substrate surface is a polymeric material. It is preferred that the substrate surface is suitable for molding articles and therefore not chemically reactive with the compounds used to prepare the molded articles. It is also preferred that the substrate surface will not tightly adhere to the molded articles. For example, if the molded articles are to be of an epoxy compound or of polyurethane, it is usually desired that the substrate will not tightly adhere to an epoxy compound or to a polyurethane when cured. Substrates for this purpose can have surfaces of materials known to those skilled in the art which do not tightly adhere to molded epoxy compounds and polyurethanes such as polyethylene, polypropylene and silicone rubber or the substrates can be made of these materials or other materials which have a surface coated with various suitable release agents and parting films also known to those skilled in the art.

A wide range of other substrate surfaces can be used which are preferably coated with the release agents and used to mold articles. Such substrate surfaces are known to those skilled in the art. Representative examples of such various substrate surfaces include the various solid metals and their alloys, cured millable gum silicone rubbers, cured natural rubber and rubber-like polymers, thermoplastic polymeric materials and thermoset plastic materials.

Most, if not all, of the substrate materials have pores in their surfaces and therefore are permeable to some degree. Representative examples of some of the various metals are aluminum, iron and their alloys. Representative of the various rubber-like polymers are rubbery polyurethanes and rubbery cured polymers and copolymers such as rubbery polymers of conjugated dienes including polybutadiene, polyisoprene, chloroprene, copolymers of butadiene and isoprene which contain a major portion of butadiene, particularly copolymers of butadiene and styrene of the hot and cold SBR type which contain from about 60 to about 90 percent by weight of butadiene, copolymers of butadiene and acrylonitrile, butyl rubber, which is a polymerization product of a major portion of a monoolefin such as isobutylene and a minor portion of a diolefin such as butadiene or isoprene copolymers of ethylene and propylene, and terpolymers of ethylene, propylene and a diene. Representative of the various thermoplastic and thermoset polymers are the polyurethanes, the various epoxide resins and epoxide varnishes, polymeric polyesters and polymers formed by the open ring polymerization of unsaturated alicyclic compounds having from one through three carbon-to-carbon double bonds in the alicyclic ring such as polyoctenamers and polydodecenamers.

Representative of the various release agents for the substrate surfaces are those that do not adhere to the epoxy compounds and polyurethanes and which do not react with polyurethane reactants and epoxy compounds to reduce the flexibility, tear, tensile strength and cold temperature properties of cured polyurethane compositions and epoxy compounds. Any of the many releasing agents or parting agents known to those skilled in the art to be useful in preparing epoxy and polyurethane castings may be used in this invention provided they meet the above requirements.

Some of the many suitable release agents include the polyethylene and polypropylene waxes and emulsions, natural waxes, synthetic waxes, dimethyl silicone fluids, greases and higher polymers, soya bean fatty acid types or vegetable cephalin and lecithin, soaps, fluorocarbons, polyvinyl alcohol and fluorosilicones.

In the practice of this invention, it has been found that even if a substrate is coated with a release agent, when the release agent coating is contacted in the presence of water and carbon dioxide with the substituted methyl amine compounds, the release agent coating can apparently be penetrated and the surface of the substrate can still become modified by the formation of the deposits on the surface and within the pores of the substrate. When the surface of a substrate becomes modified with deposits in this manner the surface definition of the substrate is reduced and molded articles are more difficult to release from the substrate. Such a modified substrate surface can be treated by the method of this invention to substantially remove the so-called deposits when formed on the substrate surface or within its pores, following which a release agent coating can be re-applied to the substrate surface.

As hereinbefore described, the deposits formed on and within substrate surfaces prepared from silicone rubbers can be treated by the method of this invention. Silicone rubbers are a class of materials well known to those skilled in the art as rubbery cured poly(organosiloxanes). The silicone rubbers are particularly suitable substrates for molding epoxy and polyurethane articles because they can form flexible substrates which do not tightly adhere to such articles after the articles are molded. Such substrates may be produced by curing room temperature vulcanizing liquid silicone rubbers or millable gum silicone rubbers well known to those skilled in the art.

Representative of the room temperature vulcanizing liquid silicone rubbers are those described as organopolysiloxane compositions containing silicon-bonded hydroxyl groups which can be cured by metal salts of organic carboxylic acids, by quaternary ammonium compounds or by epoxide containing compounds in the presence of primary, secondary or tertiary amines.

In general, these silanol-containing organopolysiloxanes contain an average of from about 1.0 to 1.98 organic groups attached to silicon through silicon-carbon linkages, and contain an average of from 0.01 to 1 silicon-bonded hydroxyl groups per silicon atom. Alternatively, some of the silicon-bonded hydroxyl groups can be replaced with alkoxy groups or with pendant hydrogen atoms.

These compositions can be described as having the average formula (1) 

where R is a monovalent hydrocarbon radical or a substituted monovalent hydrocarbon radical, R' is an alkyl radical containing from 1 to 8 carbon atoms, $a$ has a value of from 1.0 to 1.98, $b$ has a value from 0.01 to 1, $c$ has a value of from 0 to 0.99, the sum or $b+c$ is from 0.01 to 1, and the sum or $a+b+c$ is from 1.01 to 2.1. Included among the radicals represented by R are, for example, alkyl radicals, e.g., methyl, ethyl, propyl, butyl, octyl, decyl, etc. radicals; aryl radicals, e.g., phenyl naphthyl, xylyl, tolyl, etc. radicals; aralkyl radicals, e.g., benzyl, phenyl-ethyl, styryl, etc. radicals; alkenyl radicals, e.g., vinyl, allyl, etc., radicals; clycloaliphatic hydrocarbon radicals, e.g., cyclohexyl, cycloheptyl, cyclohexenyl, etc. radicals; cyanoalkyl radicals, e.g., cyanoethyl, cyanomethyl, cyanopropyl, etc., radicals; halogenated monovalent hydrocarbon radicals, e.g., chloromethyl, bromomethyl, chloroethyl, chlorophenyl, tetrachlorophenyl and dibromophenyl radicals.

Representative of the millable silicone rubber gums are those described as: organo-substituted polysiloxanes, commonly called dialkyl or alkyl-aryl polysiloxane gums. The substituted groups are usualy at least 50 percent in number methyl groups. The remainder of the groups are usually methyl or methyl with 5 to 20 percent phenyl or methyl with phenyl and vinyl, or methyl, vinyl or cyanopropyl groups, methyl vinyl and ethyl groups, or methyl and trifluoropropyl groups. The millable silicone rubber gums can be shown by the empirical formula

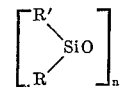

where R and R' are selected from the class consisting of the methyl and ethyl groups, the halogen and nitrile substituted alkyl groups containing from 1 to 4 carbon atoms, phenyl, halogenated phenyl, vinyl and cyclohexenyl groups and $n$ is a large number. R and R' may, if desired, be predominately or entirely methyl groups.

The millable gum silicone rubbers are generally cured by reacting the poly(organosiloxane) with a peroxide such as 2,4-dichlorobenzoyl peroxide, di-(tertiarybutyl)perbenzoate, tertiarybutyl perbenzoate, benzoyl peroxide or dicumyl peroxide. Usually about from 0.5 to 15 and preferably 1.0 to 3.0 parts of curing agent per 100 parts by weight of silicone rubber are used, depending on the percentage of unsaturated substitution present.

Various fillers can be added to the silicone rubber before curing, typical of which are, for example, fume silicas, silica aerojels, organo-silane modified silicas, barium and cadmium titanates, zirconates and stannates; diatomaceous earth, clays, calcium carbonate, finely ground quartz, barites, iron oxide, zinc oxide, titanium dioxide and mixtures thereof.

The cured silicone rubbers have various physical properties. For example, they may have tensile strengths from about 100 to about 1000 pounds per square inch, elongations of from about 100 to 600 percent and a Durometer hardness, Shore A scale of from about 20 to about 60.

It has been found that if the substrate surface having the deposit thereon is a silicone rubber, it is preferred that the organic acids are concentrated so that they will wet and penetrate the silicone rubber surface. Preferably they contain less than about 5 weight percent of water based on the acid.

When molded polyurethane articles are prepared by applying a polyurethane reaction mixture containing at least one of the substituted methyl amine compounds to a substrate mold surface in the presence of atmospheric water and carbon dioxide, curing the reaction mixture and removing the molded polyurethane article from the mold, the harmful deposits can progressively form and build up on the substrate surface and adhere to successive molded articles. Diamines having amine groups attached to nonbenzenoid carbon atoms are used as curatives or chain extenders for polyurethanes and therefore are used to form polyurethane reaction mixtures.

Thus, in the practice of this invention, a method of removing deposits from substrate mold surfaces, where the said deposits are formed by contacting the substrate surface in the presence of water and carbon dioxide with the polyurethane reaction mixture, curing the reaction mixture, and removing the resulting cured polyurethane article from the substrate surface, comprises treating the said deposits with an acid selected from the group consisting of formic acid, acetic acid, and propionic acid and drying the substrate surface. If the deposits are formed on a permeable mold substrate surface such as a silicone rubber by the molding of a polyurethane containing the substituted methyl amine, the said deposits can be removed from its pores by successively treating the deposit with successively lower acids selected from the group consisting of formic acid, acetic acid, and propionic acid, and drying the substrate surface.

The polyurethane reaction mixtures which can be used in the practice of this invention to prepare mold substrate surfaces and which can be used to prepare molded articles on substrate surfaces are prepared from a reactive hydrogen-containing polymeric material, an organic polyisocyanate and at least one of the substituted methyl amines which are diamines having amino groups attached to nonbenzenoid carbon atoms. It is to be understood that the polyurethanes referred to in this specification may also contain polyurea linkages. Usually a solvent is added to the reaction mixture so that it will be in the form of a fluid mixture or solution. Generally, sufficient solvent is added to form a solution containing from about 35 to about 65 percent solids. However, a higher or lower concentration of solids can be used, depending upon the reactants used and upon the intended use of the solution.

The reactive hydrogen-containing polymeric material used comprises at least one member selected from the group consisting of polyester polyols, polyesteramides, polyether polyols, dihydroxy terminated polymers of conjugated diene hydrocarbons, and castor oil. The reactive hydrogen-containing material generally used has a molecular weight between about 700 and about 5000 and, usually, between about 1000 and about 3000. Generally the polyester polyols are the preferred active hydrogen-containing material where high strength and solvent resistance are desired.

Representative examples of polyester polyols are the condensation products of low molecular weight polyols with an organic polycarboxylic acid or anhydride. Representative low molecular weight polyols are glycols such as ethylene glycol, propylene glycol, butylene glycol, pentylene glycol, decamethylene glycol, etc. Representative examples of the organic dicarboxylic acids that can be used are succinic acid, glutaric acid, adipic acid, phthalic acid, terephthalic acid, isophthalic acid, suberic acid, sebacic acid, pimelic acid, and azelaic acid. The anhydrides of such acids can be used in place of the acid. If desired, from about one to 20 percent by weight of a triol or higher polyfunctional polyol or polyfunctional acid can be present to produce branching in the polyurethane polymer.

Polyether polyols useful in preparing the polyurethanes used in this invention can be prepared by polymerizing or copolymerizing alkylene oxides such as ethylene oxide, propylene oxide, and butylene oxides, by polymerizing or copolymerizing the low-molecular weight glycols, or by the reaction of one or more such alkylene oxides with the glycols or with triol, or with a polycarboxylic acid such as phthalic acid. The polyether polyols include polyalkylene-aryl ether glycols or triols, polytetramethylene ether glycols, polyalkylene ether-thioether glycols or triols, and alkyl resins. Generally, the polytetramethylene ether glycols are the preferred polyether glycols.

Representative examples of dihydroxy-terminated polymers of conjugated diene hydrocarbons are dihydroxy-terminated polymers of isoprene and butadiene and their copolymers with minor amounts of vinyl compounds such as styrene and acrylonitrile.

Polyesteramides may be prepared by reacting a diamine, a glycol, and a dicarboxylic acid under conditions which will remove the water of condensation. Representative glycols and dicarboxylic acids useful in preparing polyesteramides are those useful in preparing polyesters, examples of which have already been shown. Various diamines may be used in forming the polyesteramides, representative of which are ethylene diamine, hexamethylene diamine, decamethylene diamine, cyclohexyl diamine, phenylene diamine, methylene dianiline, toluidine diamine, dichlorobenzidine, and methylene-bis-chloroaniline.

The organic polyisocyanates used to prepare the polyurethanes include various organic diisocyanates and mixtures thereof. Generally the organic diisocyanates are preferred. The organic polyisocyanates can be aromatic, aliphatic, or cycloaliphatic or combinations of these types.

Representative examples of such polyisocyanates include the toluene diisocyanates, m-phenylene diisocyanate, 4-chloro-1,3-phenylene diisocyanate, 4,4'-tetramethylene diisocyanate, 1,6-hexamethylene diisocyanate, 1,10-decamethylene diisocyanate, 1,4-cyclohexylene diisocyanate, 4,4'-methylene bis (cyclohexylisocyanate) and 1,5-tetra-hydronaphthalene diisocyanate, and mixtures of such diisocyanates. For the purpose of the present invention, the toluene-diisocyanates, diphenylmethane-4,4'-diisocyanate and 3,3'-dimethyl-4,4'-bisphenylene diisocyanate, are generally preferred although the diisocyanate having isocyanate groups connected to nonbenzenoid carbon atoms are preferred where color retention is important.

The polyurethane polymers are usually prepared by forming a liquid polyurethane reaction mixture by reacting a reactive hydrogen-containing polymeric material with a polyisocyanate to form an isocyanate terminated polyurethane which is then mixed with the diamine. The reaction mixture is then cured to form the polyurethane polymer. The isocyanate terminated polyurethanes can be prepared by reacting the reactive hydrogen-containing polymeric material with the organic polyisocyanate in proportions such that the ratio of isocyanate groups to the reactive hydrogen-containing groups of the reactive hydrogen-containing polymeric material is from about 1.1/1 to about 12/1 and preferably about 1.2/1 to about 2.5/1. These materials are generally reacted at temperatures from about 20° C. to about 150° C. The reactive hydrogens of the reactive hydrogen-containing polymeric material are supplied by hydroxyl groups and amino groups.

Other methods known to those skilled in the art of preparing polyurethanes with or without solvents being present may also be used.

Any of the nonreactive solvents normally used in making paints which are suitable for spraying are useful as diluents for the isocyanate-terminated polyurethanes of this invention. Representative examples of these are benzene, toluene, the paraffinic naphthas, the naphthenic naphthas, the aromatic naphthas, ethyl formate, propyl formate, butyl formate amyl formate, ethyl acetate, propyl acetate, methyl acetate, butyl acetate, amyl acetate, acetone, methyl ethyl ketone, diethyl ketone, methyl isoamyl ketone, Cellosolve acetate, dioxane, lower nitraparaffins, etc. Mixtures of solvents may be used to obtain satisfactory spreading properties and evaporation rates, particularly when the polyurethane is to be used as a spray composition and aplied to a suitable surface.

The isocyanate-terminated polyurethane, sometimes called a prepolymer, is usually dissolved or dispersed in the solvent to form a solution or dispersion which is then reacted with the diamine to form a cured polyurethane. The diamine is usually added to the isocyanate-terminated polyurethane in a ratio of from about 0.5/1 to about 1.5/1 and, preferably, about 0.8/1 to about 1.0/1 amine groups of the diamine for each isocyanate group in excess of the reactive hydrogen groups of the reactive hydrogen-containing polymeric material.

The following illustrative examples are set forth to further exemplify the objects and advantages of the invention. The parts and percentages are by weight unless otherwise indicated.

Examples I–XII

Liquid polyurethane reaction mixtures were prepared by a prepolymer method with various diamines having amino groups attached to nonbenzenoid carbon atoms, cast onto various substrate surfaces in the presence of atmospheric water and carbon dioxide, cured to form solid polyurethanes, and the solid polyurethanes were released from the substrates. For the purpose of this disclosure these polyurethane castings are referred to as Examples I through XII and are shown in Table 1. The substrates used in these examples are those which normally do not tightly adhere to the cured polyurethane. For Examples I through X a silicone rubber substrate was used, in Example XI a natural rubber substrate was used, and in Example XII a cured polyurethane substrate was used. In both of Examples XI and XII, a soya bean fatty acid release agent was coated over the substrate surface.

In Example I, 14 successive polyurethane articles, hereinafter also referred to as parts, were molded on the silicone rubber substrate surface. The polyurethane articles were molded on the substrate at a rate of about 10 molded articles per day by applying a liquid polyurethane reaction mixture to the substrate surface and curing the reaction mixture for about 30 minutes at 60° C. At the end of each day the mold substrate was allowed to rest for about 12 hours. At the end of the third day 29 molded articles had been prepared. Each of the molded polyurethane articles had a successively reduced gloss progressively ranging from a gloss of 3 gloss units for the first molded article to a gloss of about 0.5 loss units for the twenty-ninth molded article. The gloss was determined with a 60° glossmeter according to ASTM Method D523–66T. The silicon rubber mold surface during the successive molding operations became progressively harder and assumed a white discoloration. The molded polyurethane articles became progressively more difficult to release from the silicone rubber substrate. Under microscopic examination after the twenty-ninth molded article, the silicon rubber surface was observed to be distorted, swelled, and cracked and to be impregnated with a white crystalline deposit.

The thirtieth polyurethane molded article was prepared on the substrate the following day. The thirtieth cured polyurethane article adhered to the substrate with sufficient tenacity to tear the silicone rubber mold substrate upon its removal.

In Examples II through IX, the silicone rubber substrate was washed with various organic acids and organic acid-solvent mixtures after about each 15th polyurethane molded article or part was prepared on its surface by the method of Example I. As shown in Table 1, the silicone rubber substrate maintained its good release properties but the gloss of the molded polyurethane articles decreased from a gloss of 3 gloss units to a gloss of 0 gloss units.

In Example X, after about each 15 parts, the mold was washed with a mixture of glacial acetic acid and chloroform. After about each 75 parts, the mold surface was first washed with the glacial acetic acid mixture followed by washing the mold with formic acid. As shown in Table 1, after 600 parts, the silicone rubber substrate showed excellent release properties as to its ability to release the polyurethane molded articles and the molded polyurethane articles had a gloss of 2.5 gloss units compared to a gloss of 3.0 units for the original casting from the silicone rubber substrate.

For Examples XI and XII the substrates were washed with a mixture of 50 percent by weight glacial acetic acid in acetone after about each 40 parts. The mold release agent was applied to the substrate surface before each polyurethane article was molded on the silicone rubber substrate.

The flexible silicon rubber molds used for Examples I to X were prepared by casting a liquid room temperature vulcanizing silicone rubber over the surface of a shaped leather grained substrate. The silicone rubber was cured at about 25° C. for 8 hours and was easily removed from the leather grained substrate to form a flexible, self-releasing silicone rubber mold having an inner surface, the said inner surface being a negative reproduction of the leather grained surface of the said substrate. The molds of silicone rubber were then further post-cured for about 3 days at about 250° C. and for 8 hours at about 60° C. The inner surface of the silicone rubber molds had a gloss of about 30 gloss units. The liquid room temperature curing silicone rubber used to prepare the flexible molds was prepared by mixing components A and B or RTV 588 (obtained from The Dow Corning Company), immediately prior to preparing the mold of silicone rubber. Component A comprised a mixture of a prepolymer, chain extender, stabilizers, oils and fillers. The prepolymer was a silanol terminated polyorganosiloxane, and the chain extender a polyalkoxy substituted polyorganosiloxane. Component B comprised dibutyltin diluarate catalyst, fillers and oils.

The polyurethane reaction mixtures used for Examples I to XII were prepared by mixing a polyurethane prepolymer solution with the diamine solution. The polyurethane prepolymer was prepared according to the following recipe:

| Compound: | Parts by weight |
|---|---|
| 1,4-butane diol adipate having a molecular weight of about 2000 and an hydroxyl number of about 56 | 27 |
| 1,4-butane diol adipate having a molecular weight of about 1000 and an hydroxyl number of about 112 | 27 |
| 4,4'-dicyclohexyl methane diisocyanate | 21.5 |
| Dichloromethane (solvent) | 50 |
| Lacquer (a vinyl-acrylic copolymer used as a colorant pigment) | 10 |

The 4,4'-dicyclohexyl methane diisocyanate was heated to about 90° C. and mixed with the 1,4-butane diol adipate polymers which had also been preheated to about 90° C. and allowed to react for about 50 minutes at about 150° C. The mixture was then degassed for about 45 minutes at a reduced pressure of about 28 inches of mercury. This prepolymer was then dissolved in the dichloromethane to which the small amount of lacquer had been added.

Just before application to the mold substrate, the polyurethane prepolymer was mixed with about 17 parts of a curative solution which consisted of:

| Compound: | Parts by weight |
|---|---|
| Diamine | 20 |
| Acetone | 80 |

The natural rubber substrate used in Example XI was prepared from the following:

| Compound: | Parts by weight |
|---|---|
| Natural rubber latex | 100.0 |
| Potassium oleate | 2.0 |
| 10% sodium hydroxide | 0.5 |
| Sulfur containing curing agent | 2.0 |
| Zinc oxide | 1.0 |
| Ethyl zimate | 0.5 |

The cured polyurethane substrate used in Example XII was prepared from a prepolymer of a polybutadiene polyol and 4,4' - methyl - bis - (cyclohexylisocyanate), a 2-ethyl-1,3-hexane diol curative, and dibutyltindilaurate as a catalyst.

The silicone rubber squares of Examples XIV to XXX were then washed with a solution of 50 weight percent

TABLE 1

| Examples | Mold Substrate | Diamine | Acid Wash | Frequency of wash/parts | Ability to Release After Number of Molded Parts |
|---|---|---|---|---|---|
| I | Silicone rubber | Meta-xylene diamine | None | 1/15 | Adhesion/30 parts. |
| II | do | do | Glacial acetic acid | 1/15 | Excellent/500 parts. |
| III | do | do | Glacial acetic plus CHCl³ (50%) | 1/15 | Do. |
| IV | do | do | 97% formic | 1/15 | Excellent/100 parts. |
| V | do | do | 97% propionic | 1/15 | Do. |
| VI | do | Meta-para xylene diamine | Glacial acetic plus CHCl³ (50%) | 1/15 | Excellent/600 parts. |
| VII | do | 4,4'-diamino dicyclohexyl methane | do | 1/15 | Excellent/100 parts. |
| VIII | do | Menthane diamine | do | 1/15 | Do. |
| IX | do | Diamine A-100 [1] | do | 1/15 | Excellent/80 parts. |
| X | do | Meta-para xylene diamine | Glacial acetic plus CHCl³ (50%) and 97% Formic acid | 1/15 1/75 | Excellent/600 parts. |
| XI | Natural rubber latex | do | Glacial acetic and acetone | 1/40 | Excellent/300 parts. |
| XII | Polyurethane | do | do | 1/40 | Do. |

[1] A long chain fatty acid diamine obtained from General Mills, Inc.

Examples XIII–XXX

To illustrate deposit formation by various substituted methyl amines in the presence of water and carbon dioxide in Examples XIII to XXX small one inch by one inch squares of silicone rubber were prepared by casting and curing a liquid room temperature vulcanizing silicone rubber prepared according to the method used in Examples I to XII.

For Example XIII, a liquid polyurethane reaction mixture was prepared, cast and cured on the surface of a silicone rubber square. The polyurethane reaction mixture was cured at about 25° C. for about 12 hours. The layer of cured polyurethane did not tightly adhere to the surface of the silicone rubber square and was easily released and removed from the said silicone rubber surface.

For Examples XIV to XXV, the silicone rubber squares were immersed in solutions of various compounds having amino groups attached to nonbenzenoid carbon atoms for about 96 hours at about 30° C. The squares were then dried at about 25° C. for about 48 hours in the atmosphere which contained atmospheric water and carbon dioxide.

When the silicone rubber squares were dry, the appearance of their surfaces was noted in Table 2 and according to the method of Example I, a liquid polyurethane reaction mixture was prepared, cast and cured on their surfaces according to the method of Example I. In all of the Examples XIV to XXX the cured polyurethanes released from the silicone rubber with greater difficulty than from the silicone rubber which had not been treated with the compounds having amino groups. In all of the Examples XIV to XXX the treated silicone rubber squares showed visual evidence of a deposit formation.

glacial acetic acid and 50 weight percent chloroform and dried.

After the acetic acid wash the liquid polyurethane reaction mixture was cast and cured on the surface of the silicone rubber squares according to the method of Example XIII. In all of the Examples XIV to XXX, the cured polyurethane layer easily released from the silicone rubber squares.

TABLE 2

| Examples | Amine Compound | Appearance after Treatment with Amine Compound |
|---|---|---|
| XIV | 1,4-cyclohexane bis methylamine | White, crusty, migratory stain. |
| XV | 4,4'-diamino dicylcohexyl methane | Do. |
| XVI | Menthane diamine | Pink, crust, white penetrating stain. |
| XVII | Triethylene tetramine | White penetrating stain. |
| XVIII | Diethylene triamine | Do. |
| XIX | Tetraethylene pentamine | Do. |
| XX | Trimethylhexamethylene diamine | Do. |
| XXI | Isophorone diamine | Do. |
| XXII | Diamine A-100 | Do. |
| XXIII | Ethylene diamine | Do. |
| XXIV | Cyclobutane-1,2-bis-methylamine | Do. |
| XXV | Meta xylene diamine | Do. |
| XXVI | Para xylene diamine | Do. |
| XXVII | Meta-para xylene diamine | Do. |
| XXVIII | Tetrachloro paraxylene diamine | Do. |
| XXIX | Imino-bis propylamine | Do. |
| XXX | Bis (amino propyl) piperazine | Do. |

Examples XXX–XXXIX

Squares of silicone rubber were prepared according to the method of Example XIII and immersed in a solution of meta-paraxylene diamine at about 30° C. for about 96 hours. The squares were then dried at about 25° C. for about 48 hours in the presence of atmospheric water and carbon dioxide.

When the silicone rubber squares were dry, their surfaces were dull and had a white crusty appearance. When a polyurethane reaction mixture was cast and cured on the surface of one of the silicone rubber squares according to the method of Example XIII the resulting cured polyurethane released from the silicone rubber with difficulty.

The modified silicone rubber squares were washed with various organic acids as shown in Table 3, and dried after the acid wash. A polyurethane reaction mixture was cast and cured on the surfaces of the silicone rubber squares according to the method of Example XIII. In all of the Examples XXXI to XXXIX, the cured polyurethane easily released from the silicone rubber squares.

In Examples XXXVII, XXXVIII, and XXXIX, the modified silicone rubber squares had been successively washed with successively lower acids. In these three examples not only were the release properties of the silicone rubber squares rejuvenated but their original gloss was substantially restored or substantially improved. Except for Example XXXIV where the dilute acid wash did not rejuvenate the silicone rubber surface, in Examples XXXI to XXXVI the release property of the silicone rubber squares was rejuvenated but their surfaces remained dull.

5. A method according to claim 4 where the solid substrate surface is selected from at least one of the group consisting of polyethylene, polypropylene, silicone rubber, and release agent coated metals, cured millable gum silicone rubber, cured natural rubber, rubber-like

TABLE 3

| Example: | Amine Compound | Acid Wash |
|---|---|---|
| XXXI | Meta-para xylene diamine | Glacial acetic acid. |
| XXXII | do | Glacial acetic 50% in $CHCl_3$. |
| XXXIII | do | Glacial acetic 50% in MEOH. |
| XXXIV | do | Glacial acetic 3% in $H_2O$. |
| XXXV | do | 97% propionic. |
| XXXVI | do | 97% formic. |
| XXXVII | do | Glacial acetic, then 97% formic. |
| XXXVIII | do | 97% propionic, then glacial acetic. |
| XXXIX | do | 97% propionic, then 97% formic. |

While certain representative embodiments and details have been shown for the purpose of illustrating the invention, it will be apparent to those skilled in the art that various changes and modifications may be made therein without departing from the spirit or scope of the invention.

What is claimed is:

1. A method of rejuvenating a substrate surface having deposits thereon, where the said deposits have been formed on the substrate surface by contacting the substrate surface in the presence of water and carbon dioxide to at least one substituted methyl amine compound, which comprises treating the deposits with an organic acid selected from at least one of the group consisting of formic acid, acetic acid, and propionic acid, and drying the substrate surface, where the said substituted methyl amine compounds are characterized by the test which comprises forming one liter of a solution containing from about 10 to about 20 parts by weight of the substituted methyl amine compound per 100 parts by weight of methyl ethyl ketone, aging the solution for 8 hours at 25° C., warming the solution to 40° C. and passing gaseous carbon dioxide at about 25° C. through the solution at a rate of about one gaseous liter per minute to form a turbidity in the solution within 60 minutes.

2. A method according to claim 1 wherein the substituted methyl amine compound is selected from the group consisting of a compound having the structure (1)
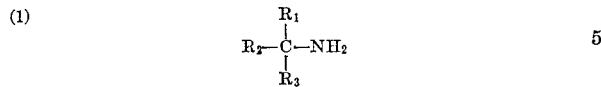

and a compound prepared by reacting a substituted methyl amine compound of (1) with a compound selected from the group consisting of an aldehyde and a ketone, where $R_1$, $R_2$ and $R_3$ are individually selected from the group consisting of (a) hydrogen radicals, alkyl, cycloalkyl, aryl, alkaryl, and aralkyl radicals, and (b) substituted alkyl, cycloalkyl, aryl, alkaryl, and aralkyl radicals where the substituents are selected from at least one of the group consisting of hydrogen, carbon, oxygen, sulfur, fluorine, chlorine, bromine, iodine, and phosphorous.

3. A method according to claim 1 where the substituted methyl amine compound is a diamine having amino groups attached to nonbenzenoid carbon atoms.

4. A method according to claim 1 where the substituted methyl amine compound is selected from the group consisting of ethylene diamine, hexamethylene diamine and dimethyl hexamethylene diamine; isophorone diamine, 1,4-cyclohexane bis methylamine, 4,4'-diamino-dicyclohexyl methane, meta xylene diamine, paraxylene diamine, tetrachloroparaxylene diamine, cyclobutane-1,2 bis methylamine, menthane diamine, imino bis propylamine, bis (amino propyl) piperazine, diethylene triamine, triethylene tetramine, and tetraethylene pentamine.

polymers, thermoplastic polymeric materials, and thermoset polymeric materials.

6. A method according to claim 5 where the substrate surface is a silicone rubber, and where the organic acid is concentrated.

7. A method according to claim 1 where the said deposit is formed in the pores of a substrate surface which comprises successively treating the deposit with successively lower organic acids selected from the group consisting of formic acid, acetic acid, propionic acid, and drying the said substrate surface.

8. A method according to claim 1 where the organic acid is mixed with an inert solvent.

9. A method according to claim 1 where the deposit is formed by contacting the substrate surface in the presence of water and carbon dioxide with a polyurethane reaction mixture, curing the reaction mixture, and removing the resulting cured polyurethane article from the substrate surface, where the polyurethane reaction mixture contains at least one of the substituted methyl amine compounds.

10. A method according to claim 9 where the deposit is removed from the substrate surface and where the substituted methyl amine compound is selected from at least one of the group consisting of ethylene diamine, hexamethylene diamine and dimethyl hexamethylene diamine; isophorone diamine, 1,4-cyclohexane bis methyl amine, 4,4'-diamino-dicyclohexyl methane, meta xylene diamine, para-xylene diamine, tetrachloroparaxylene diamine, cyclobutane-1,2 bis methylamine, menthane diamine, imino bis propylamine, bis (amino propyl) piperazine, diethylene triamine, triethylene tetramine, and tetraethylene pentamine.

11. A method according to claim 10 where the solid substrate surface is selected from at least one of the group consisting of polyethylene, polypropylene, silicone rubber, and release agent coated metals, cured millable gum silicone rubbers, curred natural rubber, rubber-like polymers, thermoplastic polymeric materials, and thermoset polymeric materials.

12. A method according to claim 11 where the substrate surface is a silicone rubber, where the organic acid is concentrated and where the said polyurethane reaction mixture is prepared from (a) at least one reactive hydrogen-containing polymeric material having a molecular weight between about 700 and about 5000 selected from the group consisting of polyester polyols, polyester amides, polyether polyols, dihydroxyl-terminated polymer of conjugated diene hydrocarbons, and castor oil, (b) at least one organic polyisocyanate, the overall molar ratio of the isocyanate groups of the polyisocyanate to the reactive hydrogens of the hydrogen-containing polymeric material being between about 1.1/1 and about 12/1, and (c) at least one diamine having amino groups attached to nonbenzenoid carbon atoms in a ratio of from about 0.5/1 to about 1.5/1 of amine groups to the isocyanate groups in excess of the reactive hydrogen-containing polymeric material.

References Cited

UNITED STATES PATENTS

| | | | |
|---|---|---|---|
| 1,952,417 | 3/1934 | Chandler | 134—3 |
| 2,417,468 | 3/1947 | Canziani et al. | 134—28 |
| 2,862,239 | 12/1958 | Pollard et al. | 264—39 |
| 3,369,935 | 2/1968 | Booth et al. | 134—28 X |

MORRIS O. WOLK, Primary Examiner

J. D. OLSEN, Assistant Examiner

U.S. Cl. X.R.

134—28, 41; 252—142; 264—39

PO-1050
(5/69)

UNITED STATES PATENT OFFICE
CERTIFICATE OF CORRECTION

Patent No. 3,475,217   Dated October 28, 1969

Inventor(s) Larry H. Watters

It is certified that error appears in the above-identified patent and that said Letters Patent are hereby corrected as shown below:

Column 2, Formula 1, should appear as follows:

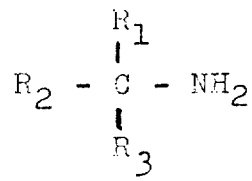

Column 6, line 4, "or" should read -- of --;

Column 7, line 74, "alkyl" should read -- alkyd --;

Column 11, line 57, "XXV" should read -- XXX --;

SIGNED AND
SEALED
JUN 9 1970

(SEAL)
Attest:

Edward M. Fletcher, Jr.
Attesting Officer

WILLIAM E. SCHUYLER, JR.
Commissioner of Patents